Aug. 16, 1966  F. MUSSANO  3,266,150
APPARATUS FOR CORRECTING THE SWERVING OF THE
STEERING WHEELS OF AN AUTOMOTIVE VEHICLE
Filed Sept. 17, 1964  2 Sheets-Sheet 1
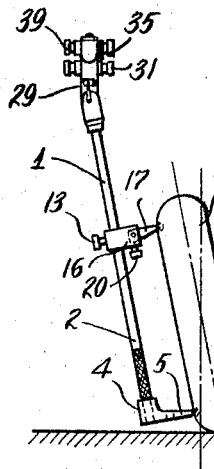
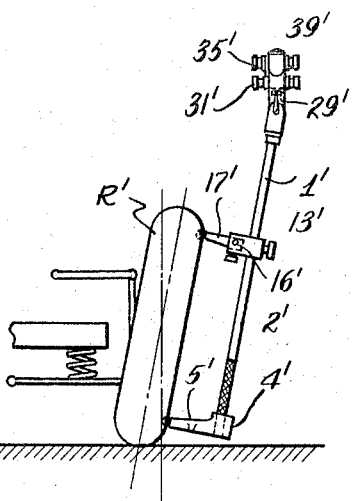
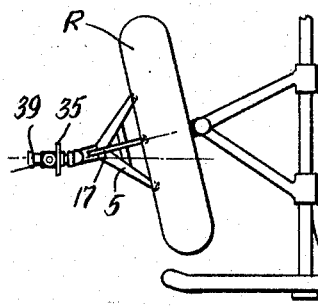
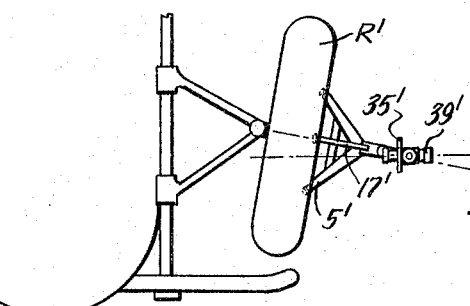
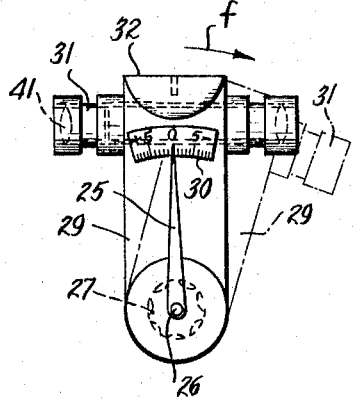
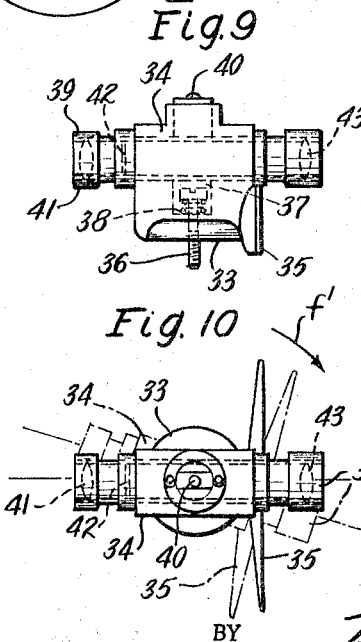
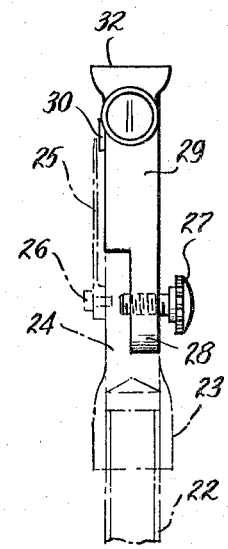
INVENTOR
FERRUCIO MUSSANO
BY Lyon&Lyon
ATTORNEYS

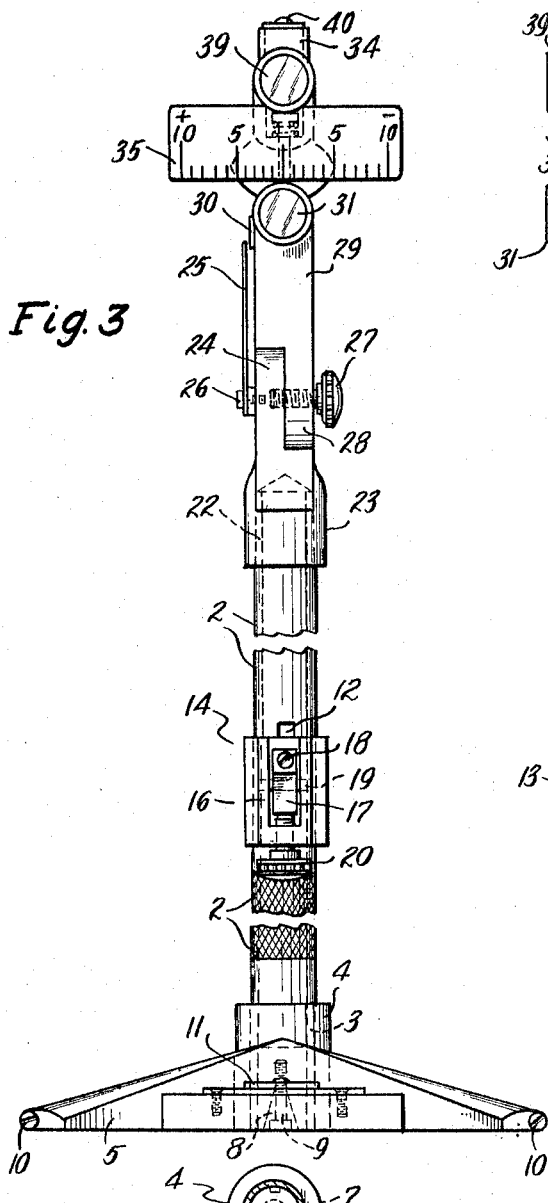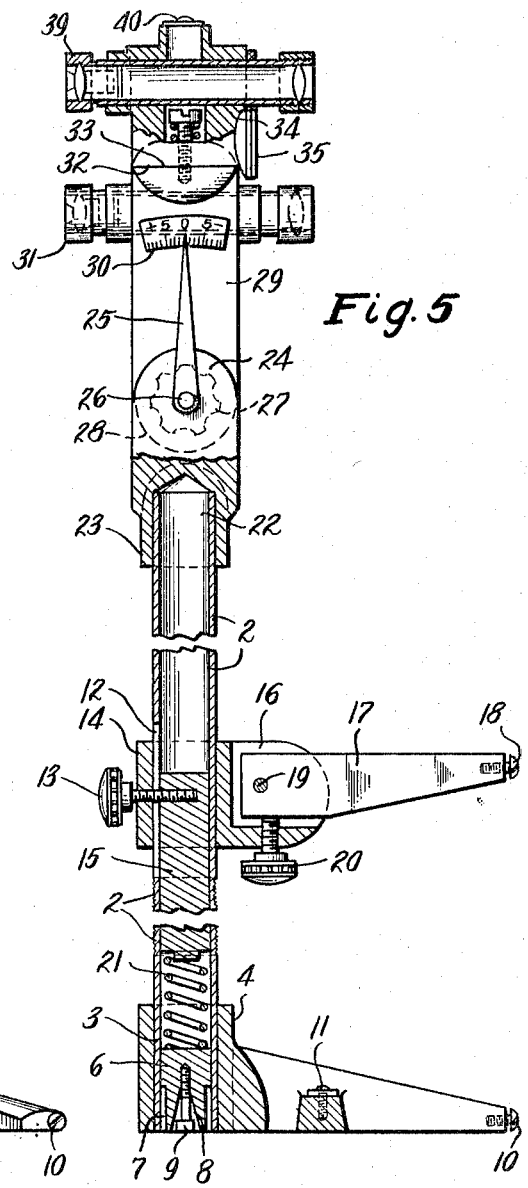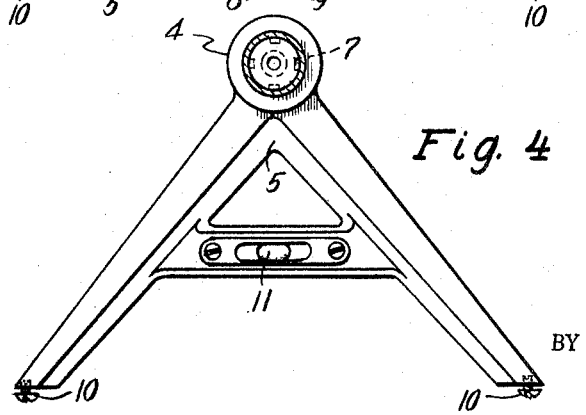

United States Patent Office 3,266,150
Patented August 16, 1966

3,266,150
APPARATUS FOR CORRECTING THE SWERVING OF THE STEERING WHEELS OF AN AUTOMOTIVE VEHICLE
Ferrucio Mussano, 134 D'Echallens Ave., Lausanne, Switzerland
Filed Sept. 17, 1964, Ser. No. 397,331
4 Claims. (Cl. 33—46)

It is known that the high speeds reached by automotive vehicles, as well as the roughness of the road or obstacles on the road which must be surmounted, particularly in habitable places, have a tendency to deflect the steering wheel, so that it is necessary to cause them to toe-in toward the front in case of a positive camber angle of said wheels in order to avoid the tendency of the vehicle to swerve.

The amount of the positive and negative toe of the steering wheels is not easy to determine and requires numerous adjustments of the steering members provided for this purpose.

The present invention, which is directed at overcoming this drawback, has as its object an apparatus for correcting the swerving of the steering wheels of an automotive vehicle. It is characterized by the fact that it comprises a set of two identical legs which can be fitted, respectively, to the rim of each of the steering wheels of a vehicle which has a tendency to swerve, each of the said legs comprising a tube, the lower end of which is fastened to a foot having the shape of a fork with two arms, the said fork being provided with an air-bubble level, an adjustable arm support capable of sliding along said tube, the ends of the two fork arms and the end of the adjustable arm being intended to be engaged below the circular bead of said rim, respectively, in the corners of an equilateral triangle, the base corners of which are represented physically by the tips of the fork, the upper end of said rod being fastened in a tubular ferrule forming the support of a camber-angle indicator, a pointer rigidly connected with said support and located parallel to the longitudinal axis of the tubular ferrule, indicating the value of the said angle on a graduated scale fastened to the indicator, the said indicator being capable of pivoting on a transverse pin which connects the support to the indicator, the upper part of the indicator being provided with a sighting telescope with collimator and a horizontal flat surface of circular shape in contact with a similar surface provided on the lower portion of a part serving as support, for a sighting scale oriented in the direction of the other adjustable leg, the upper portion of the said part being provided with a collimator telescope and an air-bubble level, the part being capable of pivoting on a vertical pin connecting the two circular surfaces in contact with each other, the said pin being formed of a screw, the shank of which is engaged in a return spring, all in such a manner that when the steering wheel of the vehicle is placed in neutral position and each leg is fitted on the respective rim of the steering wheels of the vehicle, the collimator of the upper telescope of one of the legs is adjusted to the zero of the sighting scale of the other leg, whereupon the collimator of the upper telescope of the other leg is adjusted to the zero of the sighting scale of the first leg so as to obtain a sighting line parallel to the axle of the said steering wheels; thereupon the values corresponding to the negative or positive toe (toe-in or toe-out) of the said wheels is read from the collimators of each of the telescopes of the camber angle indicators and the angle of toe is corrected by means of the steering members provided for this purpose in order to correct by means of the lower telescopes the zero sightings of the respective opposite scales.

The accompanying drawing shows, by way of example, one embodiment of the apparatus which forms the subject matter of the invention.

FIGURES 1 and 2 show schematically and partially the front of an automobile, the two identical adjustable legs which constitute the apparatus being fastened onto the respective steering wheels, FIGURE 1 being an elevation and FIGURE 2 a plan view of FIGURE 1.

FIGURES 3 to 5 show, on a larger scale, an adjustable leg, FIGURE 3 being a partial elevation, FIGURE 4 being a plan view of the foot of the leg shown in FIGURE 1, and FIGURE 5 being a partial side view, partially in section.

FIGURES 6 to 8 show a camber-angle indicator, FIGURE 6 being an elevation thereof, FIGURE 7 a plan view of FIGURE 6, and FIGURE 8 a side view, seen from the side of the telescope objective.

FIGURES 9 and 10 show a part serving as support for a sighting telescope, FIGURE 9 being an elevation and FIGURE 10 a plan view of FIGURE 9.

The apparatus, in the embodiment shown, comprises a set of two identical legs 1, 1' (FIGURES 1 and 2), each leg, for example the leg 1 (FIGURES 3 to 5), comprising a tube 2, of a length of about 1 meter.

The lower end 3 of the tube 2 is fastened in the heel 4 of a foot 5 having the shape of a fork with two arms. A small column 6 is housed within the end 3, the said column being provided at the periphery of its lower portion with radial slits, for instance four slits 7, and in its central portion with a recess 8 of frusto-conical section in which there is engaged a screw 9 intended to spread the sectors of the column located between the slits 7 and to apply them by the screwing pressure against the inner wall of the tube 2.

The foot 5 is furthermore provided at the free end of each of the arms of the fork with a screw 10, the protruding head of which can fit below the bead of the rim of the wheel against which the leg 1 is fitted, as shown in FIGURES 1 and 2. Between the two arms of the fork, there is provided a brace, which is integral with the foot 5, an air-bubble level 11 being fastened to said brace. The level 11 is intended to assure verticality of the two legs 1 and 1'.

The tube 2 is provided with a longitudinal slot 12 in which there is engaged the head of a screw 13 intended to assure the fastening of a third point on the bead of the rim of the wheel. For this purpose, a sleeve 14 can slide along the tube 2, the screw 13, which passes through the slot 12 being fastened in a cylindrical part 15 housed within the tube 2. The sleeve 14 is provided on the side opposite the slot 12 with a U-shaped clevis 16 in which there is engaged one of the ends of an arm 17 of trapezoidal shape, the other end of which is provided with a screw 18 having the same purpose as the screws 10 fastened to the ends of the arms of the fork 5. The arm 17 can pivot on a pin 19 fastened in the side plates of the clevis 16 and can be fastened in a given position by means of an adjusting screw 20 engaged in an internally threaded hole in the clevis 16. A coil spring 21, the ends of which are in contact with the base surface of the part 15 and the surface of the top of the small column 6, respectively, during its expansion movement permits the automatic pushing of the sleeve 14 upward to assure the fastening of the screw 18 on the bead of the rim and therefore the mounting of the leg 1 on the wheel.

The tube 2 is fastened at its upper end 22 in a tubular tip 23, the upper portion of which, forming the support for a camber-angle indicator, is provided with a flat 24 of semicircular shape, the said flat being oriented parallel to the adjustable arm 17. A pointer 25 is fastened by a screw 26 to the outer face and at the center of the flat 24, the said pointer being oriented parallel to the longitudinal axis of the tip 23.

At the center of the flat 24, there is also fastened the end of the stem of an adjustment screw 27 engaged in the internally threaded hole provided in the semicircular flat 28 of a camber-angle indicator 29 (FIGURES 6 to 8), the said indicator being capable of pivoting on the screw 27, for instance in the direction of the arrow $f$ as indicated in FIGURE 6. The indicator 29, fastened to the tip 23 by the screw 27, is provided in its upper portion with a scale 30, graduated from +10° to −10° for the leg 1 and from −10° to +10° for the indicator 29' of the leg 1' (FIGURES 1 and 2), the reading of the camber angle being effected by means of the pointer 25, 25', respectively, for each steering wheel after having established horizontality by means of an air-bubble level located on the upper part of each of the legs, which level will be described hereinbelow.

The upper portion of the indicator 29 also comprises a sighting telescope 31 oriented parallel to the sliding arm 27 and has a flat surface 32 of circular shape, located horizontally. This surface 32 is in contact with a surface 33 of the same form divided on the lower portion of a part 34 intended to support a sighting scale 35 (FIGURE 3).

The part 34 (FIGURES 9 and 10) can pivot on a vertical axis consisting of a screw 36 housed in a central recess 37 (FIGURE 5), the shank of said screw being engaged in a coil spring 38 resting on the bottom of said recess and being fastened in an internally threaded hole located in the center of the surface 32 of the indicator 29, thus assuring the centering of the part 34 in all positions which it may occupy during its rotation, for instance in direction of the arrow $f'$ as shown in dot-dash lines in FIGURE 10.

The sighting scale 35 bears enlarged "$mm$" markings from +10 to −10, for instance, five millimeters for one true millimeter. This scale is oriented transversely with respect to the optical axis of a sighting telescope 39 placed above the scale 35 and fastened in the part 34, the said part furthermore having an air bubble level 40 at its upper end.

Each of the collimator sighting telescopes 31, 31', 39, 39' (FIGURES 1 and 2) is provided with an eyepiece 41 (FIGURE 9), a cross-wire 42 and an objective lens 43.

The apparatus described operates in the following manner:

The steering wheel (not shown in the drawing) is placed above the vehicle in neutral position, the opposite spokes being oriented transversely with respect to the road. To each steering wheel rim R, R' (FIGURES 1 and 2), there is fastened a leg 1, 1', respectively, the position of the screw 10 of the foot 5 and of the screw 18 of the arm 17 being regulated by means of the level 11 of the foot 5. Thereupon the screw 13 is tightened to lock the sleeve 14. The two legs 1, 1' being placed in position, the collimator of the upper sighting telescope 39 is adjusted to the zero mark of the scale 35' of the leg 1' and thereupon the collimator of the telescope 39' of the leg 1' is adjusted to the zero mark of the scale 35 of the leg 1 so as to obtain a sighting line parallel to the axle—which is real or virtual, depending on the type of vehicle—of the steering wheels.

After this adjustment, one reads from the collimators of the lower telescopes 31, 31' the values corresponding to the negative or positive toe (toe-in or toe-out) of the steering wheels, and effects the correction in the angle of toe by means of the steering members provided for this purpose in order to correct, by means of the lower telescopes, the zero readings of the scales 35, 35', respectively.

I claim:

1. Apparatus for correcting the swerving of the steering wheels of an automotive vehicle, characterized by the fact that it comprises a set of two identical legs which can be fitted respectively to the rim of each of the steering wheels of a vehicle which has a tendency to swerve, each of the said legs comprising a tube, the lower end of which is fastened to a foot having the shape of a fork with two arms, the said fork being provided with an air-bubble level, an adjustable arm support capable of sliding along said tube, the ends of the two fork arms and the end of adjustable arm being intended to be engaged below the circular bead of said rim, respectively, in the corners of an equilateral triangle, the base corners of which are represented physically by the tips of the fork, the upper end of the said rod being fastened in a tubular ferrule forming the support of a camber-angle indicator, a pointer rigidly connected with the said support and located parallel to the longitudinal axis of the tubular ferrule, indicating the value of the said angle on a graduated scale fastened to the indicator, the said indicator being capable of pivoting on a transverse pin which connects the support to the indicator, the upper part of the indicator being provided with a sighting telescope with collimator and a horizontal flat surface of circular shape in contact with a similar surface provided on the lower portion of a part serving as support for a sighting scale oriented in the direction of the other adjustable leg, the upper portion of the said part being provided with a collimator telescope and with an air-bubble level, the part being capable of pivoting on a vertical pin connecting the two circular surfaces in contact with each other, the said pin being formed of a screw, the shank of which is engaged in a return spring, all in such a manner that when the steering wheel of the vehicle is placed in neutral position and each leg is fitted on the respective rim of the steering wheels of the vehicle, the collimator of the upper telescope of one of the legs is adjusted to the zero of the sighting scale of the other leg, whereupon the collimator of the upper telescope of the other leg is adjusted to the zero of the sighting scale of the first leg so as to obtain a sighting line parallel to the axle of the said steering wheels; thereupon the values corresponding to the negative or positive toe (toe-in or toe-out) of the said wheels is read from the collimators of each of the telescopes of the camber-angle indicators, and the angle of toe is corrected by means of the steering members provided for this purpose in order to correct by means of the lower telescopes the zero sightings of the respective opposite scales.

2. Apparatus according to claim 1, characterized by the fact that the ends of each of the said arms of the fork and of the said adjustable arm are provided respectively with a screw, the protruding head of which is engaged below the bead of the rim of the wheel against which the corresponding leg is fitted.

3. Apparatus according to claim 1, characterized by the fact that a small column is housed within the lower end of the tube, forming the adjustable leg, the said column being provided at the periphery of its lower portion with radial slits and a central recess of frustoconical cross-section, the sectors located between said slits being pushed against the inner wall of the said tube by means of a screwhead, the shank of the screw being fastened in a central, internally threaded hole provided at the upper part of the column.

4. Apparatus according to claim 1, characterized by the fact that the adjustable arm is of trapezoidal shape and can pivot at the end opposite that of its engagement on the bead of the rim of the wheel, on a transverse pin fastened in the side plates of a clevis of U-shaped cross-section, an adjusting screw fastened in the bottom connecting the side plates of the clevis, which screw assures the position of engagement of the arm below said rim, the said clevis being rigidly connected with a sleeve sliding on the tube of the leg, said sleeve being provided with a screw, the stem of which, passing through a longitudinal slit provided in the said tube, is fastened in a cylindrical part housed in the said tube, a coil spring being interposed between said cylindrical part and the column which is housed within the lower portion of the tube.

References Cited by the Examiner

UNITED STATES PATENTS

| | | | |
|---|---|---|---|
| 2,627,123 | 2/1953 | Taber | 33—203.18 |
| 2,689,403 | 9/1954 | Wilkerson | 33—46.2 |
| 3,081,546 | 3/1954 | Wilkerson | 33—46.2 |

LEONARD FORMAN, *Primary Examiner.*